US008922621B2

(12) United States Patent
Joung et al.

(10) Patent No.: US 8,922,621 B2
(45) Date of Patent: Dec. 30, 2014

(54) METHOD OF RECORDING THREE-DIMENSIONAL IMAGE DATA

(75) Inventors: Do-Young Joung, Seoul (KR); Tae-Sung Park, Yongin-si (KR); Yun-Je Oh, Yongin-si (KR); Jae-Yeon Song, Seoul (KR); Seo-Young Hwang, Suwon-si (KR); Doug-Young Suh, Seongnam-si (KR); Gwang-Hoon Park, Seongnam-si (KR); Kyu-Heon Kim, Seoul (KR); Yoon-Jin Lee, Yongin-si (KR); Jang-Won Lee, Chungcheongnam-do (KR)

(73) Assignees: Samsung Electronics Co., Ltd., Yeongtong-gu, Suwon-si, Gyeonggi-do (KR); University-Industry Cooperation Group of Kyunghee University, Seocheon-dong, Giheung-gu, Yongin-si, Gyeonggi-do (KR)

( * ) Notice: Subject to any disclaimer, the term of this patent is extended or adjusted under 35 U.S.C. 154(b) by 1225 days.

(21) Appl. No.: 12/254,175

(22) Filed: Oct. 20, 2008

(65) Prior Publication Data
US 2009/0122134 A1 May 14, 2009

(30) Foreign Application Priority Data

Oct. 19, 2007 (KR) .................. 10-2007-0105831
Dec. 14, 2007 (KR) .................. 10-2007-0131535

(51) Int. Cl.
  *H04N 13/00* (2006.01)
  *H04N 9/82* (2006.01)
  (Continued)

(52) U.S. Cl.
  CPC ......... *H04N 9/8205* (2013.01); *H04N 13/0066* (2013.01);
  (Continued)

(58) Field of Classification Search
  CPC .......... H04N 13/0239; H04N 13/0055; H04N 13/0296; H04N 19/00769; H04N 13/0022
  USPC .......................................................... 348/42
  See application file for complete search history.

(56) References Cited

U.S. PATENT DOCUMENTS

2002/0030675 A1  3/2002  Kawai
2003/0048354 A1  3/2003  Takemoto et al.
(Continued)

FOREIGN PATENT DOCUMENTS

EP   1633148      3/2006   ............. H04N 13/04
EP   1633148 A1 * 3/2006   ............. H04N 13/04
(Continued)

OTHER PUBLICATIONS

Chun, Sung-Moon, et al.; "Proposal for Technical Specification of Stereoscopic MAF;" Next Generation Broadcasting Standard Forum Korea; ITU Study Group 16- Video Coding Experts Group; ISO/IEC JTC I/SC 29/WG 11; No. M14664; Jun. 27, 2007; XP030043284 (hereinafter Chun).*

(Continued)

*Primary Examiner* — Jude Jean Gilles
*Assistant Examiner* — Jaren M Means
(74) *Attorney, Agent, or Firm* — Cha + Reiter, LLC.

(57) ABSTRACT

A method of storing 3D image data in a recording medium includes: loading, in a predetermined file type field, image type information indicating either one of a single stereoscopic image or a compound image including a monoscopic image and a stereoscopic image; loading, in a predetermined image configuration information container field, scene descriptor information indicating temporal and spatial relations between a plurality of media objects included in the three-dimensional image, object configuration information indicating attributes of each media object of said plurality of media objects and a configuration relation between encoded streams of the plurality of media objects, configuration information of the encoded streams; loading in an image data container field media data of an image to be stored; and loading, in a meta container field, metadata including information for playing the 3D image data.

20 Claims, 10 Drawing Sheets

(51) Int. Cl.
  *H04N 9/806* (2006.01)
  *H04N 5/765* (2006.01)
  *H04N 5/77* (2006.01)
  *H04N 9/804* (2006.01)

(52) U.S. Cl.
  CPC ......... *H04N 13/0048* (2013.01); *H04N 9/8227* (2013.01); *H04N 9/8063* (2013.01); *H04N 5/765* (2013.01); *H04N 13/0055* (2013.01); *H04N 5/77* (2013.01); *H04N 9/8042* (2013.01)
  USPC ............... 348/42; 352/86; 359/462; 396/324

(56) References Cited

U.S. PATENT DOCUMENTS

| | | | | |
|---|---|---|---|---|
| 2003/0095177 | A1* | 5/2003 | Yun et al. | 348/42 |
| 2005/0086582 | A1* | 4/2005 | Frojdh et al. | 715/501.1 |
| 2007/0146380 | A1* | 6/2007 | Nystad et al. | 345/582 |
| 2008/0191964 | A1* | 8/2008 | Spengler | 345/6 |
| 2010/0161686 | A1* | 6/2010 | Yun et al. | 707/812 |
| 2010/0182403 | A1 | 7/2010 | Chun et al. | |

FOREIGN PATENT DOCUMENTS

| | | | | |
|---|---|---|---|---|
| JP | 11-191895 A | 7/1999 | | |
| JP | 2010-530702 A | 9/2010 | | |
| JP | 2011-502375 A | 1/2011 | | |
| KR | 10-2005-0024104 A | 3/2005 | | |
| KR | 10-0716142 B1 | 5/2007 | | |
| WO | WO 2005/031652 | 4/2005 | ............. | G06T 15/20 |
| WO | 2008/156318 A2 | 12/2008 | | |
| WO | WO 2008156318 A2 * | 12/2008 | ............. | H04N 13/00 |

OTHER PUBLICATIONS

Kim, Man Bae., et al.; "The Adaptation of 3D Stereoscopic Video in MPEG-21 DIA;" Signal Processing: Image Communication Elsevier Science Publisher; vol. 18, No. 8; Sep. 1, 2003; pp. 685-697; XP004452905.

Siragusa, Jon, et al.; "General Purpose Stereoscopic Data Descriptor" Dec. 31, 1997; Internet Citation http://www.vrex.com/developer/sterdesc.pdf; XP002477340.

Chun, Sung-Moon, et al.; "Proposal for Technical Specification of Stereoscopic MAF;" Next Generation Broadcasting Standard Forum Korea; ITU Study Group 16—Video Coding Experts Group; ISO/IEC JTC 1/SC 29/WG 11; No. M14664; Jun. 27, 2007; XP030043284.

* cited by examiner

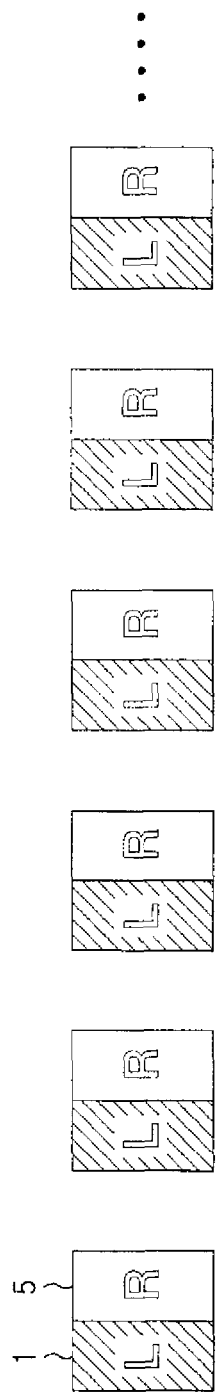
FIG.2A n side-by-side format
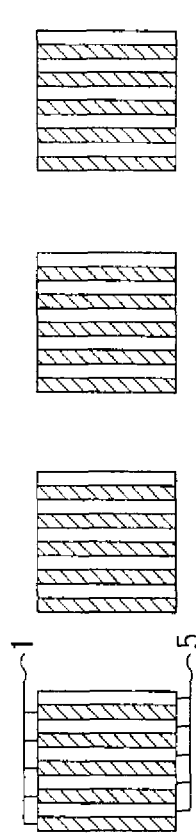
FIG.2B n vertical line interleaved format
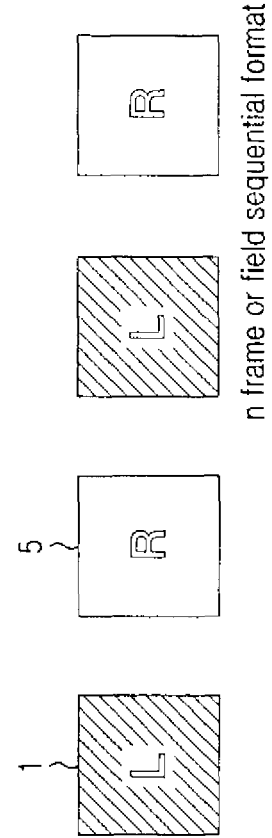
FIG.2C n frame or field sequential format

METHOD OF RECORDING THREE-DIMENSIONAL IMAGE DATA

CLAIM OF PRIORITY

This application claims priority to an application entitled "Method of Recording Three-Dimensional Image Data" filed in the Korean Intellectual Property Office on Oct. 19, 2007 and assigned Serial No. 2007-0105831 and an application entitled "Medium Recording Three-Dimensional Video Data and Method For Recording The Same" filed in the Korean Intellectual Property Office on Dec. 14, 2007 and assigned Serial No. 2007-0131535, the contents of which are hereby incorporated by reference.

BACKGROUND OF THE INVENTION

1. Field of the Invention

The present invention relates to a method of recording three-dimensional (3D) image data, and more particularly to a method of generating 3D image data in a format compatible with the ISO base media file format, and storing the generated 3D image data.

2. Description of the Related Art

A typical media file format includes a header part for describing information on the corresponding media and an image data part for storing compressed media data. While it is possible to store simple image data using the typical media file format, it is not suitable as a comprehensive structure for accommodating various types of media.

An international organization for standardization, Moving Picture Experts Group (MPEG), has defined the ISO base media file format as a basic file format applicable in common to various applications. The ISO base media file format has been designed as to hierarchically store data, such as a compressed media stream and configuration information related to the media stream, in multiple containers. The ISO base media file format does not define an encoding or decoding scheme, but basically defines a basic structure for efficiently storing an encoded or decoded media stream.

A stereoscopic image may be configured in various ways according to methods of combining left and right images. With regard to this, in order to represent a stereoscopic image on a display apparatus, it is requisite to store information on a method of combining left and right images, the number and size of divisions of left and right images, the positions of divided images, etc. in a memory of the display apparatus. Also, a stereoscopic image essentially requires temporal information, based on which left and right images are synchronized.

Therefore, it is difficult to efficiently configure a file format for storing a stereoscopic image by using the conventional typical media file format. As the ISO base media file format is not defined in consideration of a structure of a stereoscopic image, it is not suitable for a stereoscopic image.

Accordingly, there is a need for a data storage format defined in consideration of a structure of a stereoscopic image. At the same time, such a data storage format for a stereoscopic image is required to be compatible with the international standard file format, that is, the ISO base media file format, so that it can be applied to various multimedia applications.

SUMMARY OF THE INVENTION

Accordingly, the present invention provides a data storage format, which includes information on a configuration of a stereoscopic image and is compatible with the international standard file format, that is, the ISO base media file format, and a method of generating the data storage format.

In accordance with the present invention, a method of storing three-dimensional (3D) image data in a recording medium includes: loading, in a predetermined file type field, image type information indicating either one of a single stereoscopic image or a compound image including a monoscopic image and a stereoscopic image; loading, in a predetermined image configuration information container field, scene descriptor information indicating temporal and spatial relations between a plurality of media objects included in the three-dimensional image, object configuration information indicating attributes of each media object of said plurality of media objects and a configuration relation between encoded streams of the plurality of media objects, configuration information of the encoded streams; loading in an image data container field media data of an image to be stored; and loading, in a meta container field, metadata including information for playing the 3D image data.

BRIEF DESCRIPTION OF THE DRAWINGS

The above features and advantages of the present invention will be more apparent from the following detailed description taken in conjunction with the accompanying drawings, in which:

FIGS. 2A through 2C are a view illustrating an example of a structure of a stereoscopic image contained in a three-dimensional image in accordance with an exemplary embodiment of the present invention;

DETAILED DESCRIPTION OF THE INVENTION

Figure 1:
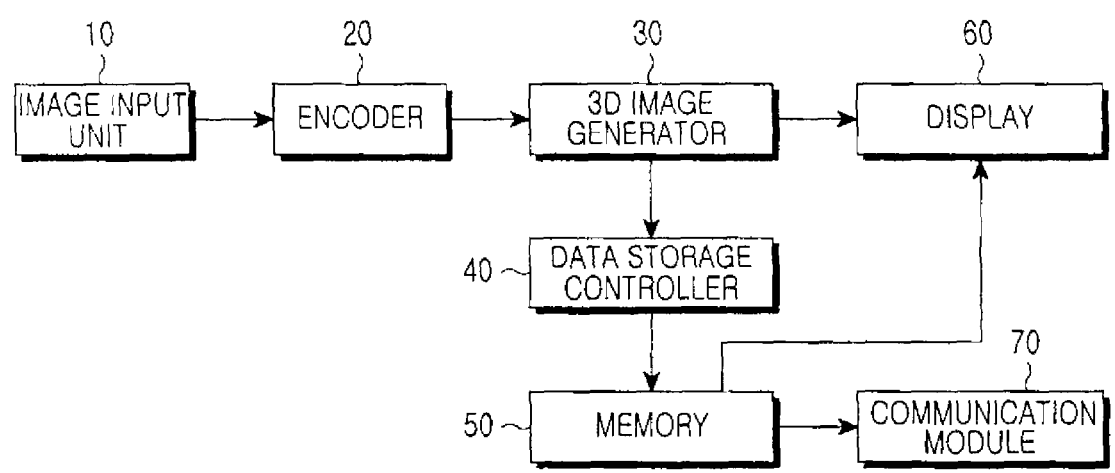
FIG. 1 is a block diagram of a stereoscopic imaging apparatus to which to apply the present invention.

Hereinafter, exemplary embodiments of the present invention will be described with reference to the accompanying drawings. It should be noted that the similar components are designated by similar reference numerals although they are illustrated in different drawings. For the purposes of clarity and simplicity, a detailed description of known functions and configurations incorporated herein will be omitted as it may obscure the subject matter of the present invention. Further, it should be noted that only parts essential for understanding the operations according to the present invention will be described and a description of parts other than the essential parts will be omitted in order not to obscure the gist of the present invention.

In an exemplary embodiment of the present invention, a three-dimensional (3D) image includes a stereoscopic image containing a combination of left and right images, and a compound image containing a combination of a stereoscopic image and a monoscopic image. Herein, the monoscopic image refers to an image containing only one of left and right images. The left and right images correspond to media data, and may be referred to as media data in the embodiment of the present invention. Also, such media data may include video data and audio data. Further, by way of example, the video data and the audio data may include media data of at least one track.

FIG. 1 illustrates a stereoscopic imaging apparatus to which the present invention is applied.

The stereoscopic imaging apparatus includes an image input unit 10, an encoder 20, a 3D image generator 30, a data storage controller 40, a memory 50, a display 60, and a communication module 70.

The image input unit 10 corresponds to a means for receiving multiple input images necessary for the generation of a stereoscopic image, and includes a plurality of lenses for projecting color signals of specific wavelengths, reflected from a subject, with various angles, and a plurality of sensor modules (e.g. modules including sensors, such as CCD and CMOS) for converting the color signals input through the plurality of lenses into electrical signals. The image input unit 10 also includes a video signal processing apparatus for converting data input from the respective multiple sensor modules into image signals including temporal/spatial information, thereby generating as many image data as the sensor modules. For example, when a stereoscopic image includes a combination of media data of left and right images, the image input unit 10 includes a lens and a sensor module for photographing the left part of a subject and a lens and a sensor module for photographing the right part of the subject, and generates respective image data, that is, media data of a left image and media data of a right image, by using data input from the two sensor modules.

The encoder 20 configures a stereoscopic image by applying a stereoscopic image configuration method to multiple image data (left and right image data) output from the image input unit 10, and then encodes the stereoscopic image. A typical apparatus encoding a stereoscopic image according to a moving picture encoding scheme (e.g. MPEG-1, MPEG-2, MPEG-3, MPEG-4, and H.264 schemes) may be employed as the encoder 20.

Also, the image input unit 10 may further include a microphone for converting an audio signal of a specific band into an electrical signal, and the encoder 20 may compress an audio signal input from the microphone by using a typical audio compression scheme known to artisans in this art.

The 3D image generator 30 generates 3D image data from multiple encoded media data in consideration of a distance from a photographed object, a photographing angle, movements of a photographing apparatus, etc.

Meanwhile, if a user views 3D images including only stereoscopic images for a long time, his/her eyes feel more fatigued than when he/she views monoscopic images. By this reason, it is difficult for a user to view 3D images including only stereoscopic images for a long time. Therefore, 3D images may include only stereoscopic images, but they preferably include an appropriate combination of stereoscopic images and monoscopic images in order to guarantee viewing of the 3D images for a long time by reducing fatigue of the eyes. Stereoscopic images and monoscopic images may be combined under the control of a user of the photographing apparatus, according to predetermined settings in the photographing apparatus, or by editing photographed stereoscopic and monoscopic images. The predetermined settings may be such that stereoscopic images or monoscopic images are periodically and repeatedly photographed at regular intervals, stereoscopic images or monoscopic images are selectively photographed according to the property or kind of an object to be photographed, or photographed images are appropriately edited.

FIG. 2 illustrates a structure of a stereoscopic image contained in a 3D image according to an exemplary embodiment of the present invention. The stereoscopic image contained in the 3D image according to this embodiment includes a combination of a left image 1 and a right image 5. Such a stereoscopic image may be configured by vertically combining a left image 1 and a right image 5 in the ratio of 1:1 within an image to construct one frame, and arranging the frame along the time axis (FIG. 2(a)), by vertically dividing a left image 1 and a right image 5 respectively, then alternately combining the divided images in sequence to construct one frame, and finally arranging the frame along the time axis (FIG. 2(b)), or by arranging a frame including a left image 1 or a right image 5 along the time axis (FIG. 2(c)). Besides, the stereoscopic image contained in the 3D image according to this embodiment may comprise more than two tracks and be configured by respective view images included in their corresponding track and by dividing a left image and a right image up and down included in one frame. In other words, the configuration of the stereoscopic image contained in the 3D image according to this embodiment can vary other than configuration illustrated in Figures.

Further, the 3D image generator 30 provides the data storage controller 40 with 3D image configuration information including information constituting video data and audio data occurring when a 3D image is generated.

The data storage controller 40 stores 3D image data, which has been generated using 3D image configuration information and data of 3D images provided from the 3D image generator 30, in the memory 50. Also, the display 60 outputs 3D images generated by the 3D image generator 30. The communication module 70 includes an interface capable of transmitting 3D images stored in the memory 50 to external devices (e.g. mobile terminal, PDA, portable terminal equipped with wireless LAN, and personal computer supporting USB or serial communication).

Figure 3A:
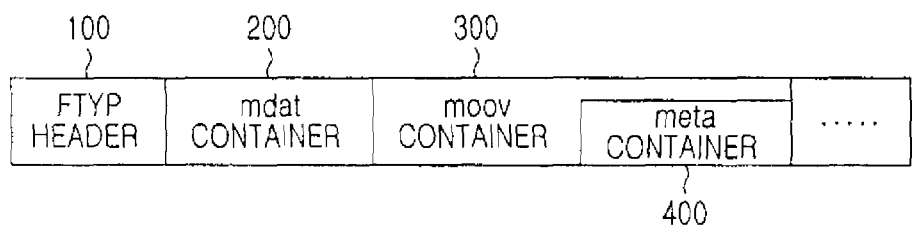
FIGS. 3a and 3b are views illustrating a storage format of three-dimensional image data in accordance with an exemplary embodiment of the present invention.

FIG. 3a illustrates a storage format of 3D image data according to an exemplary embodiment of the present invention. Referring to FIG. 3a, the storage format of 3D image data stored in the memory 50 by the data storage controller 40 includes an ftyp header 100, an mdat container 200, an moov container 300, and an meta container 400.

The ftyp header 100 contains information on the file type and compatibility of stored data. In particular, the ftyp header 100 contains information indicating whether 3D images consist of only stereoscopic images or compound images including a combination of stereoscopic and monoscopic images.

Video or audio data of each channel is recorded in units of frames in the mdat container 200.

The moov container 300 is configured as an object-based structure, and the above-mentioned 3D image configuration information is recorded in the moov 300. Content information including the frame rate, bit rate, and image size of media data, and further sync information of the media data are also recorded in the moov container 300.

The meta container 400 may include a container having information for playing the single stereoscopic image or the compound image.

Preferably, the meta container 400 is included in the moov container 300.

Figure 3B:
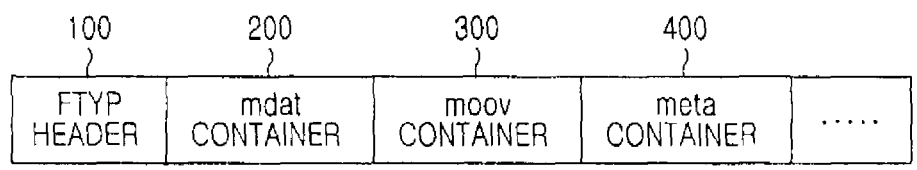

Although, the meta container 400 included in the moov container 300 has been illustrated in this embodiment, the present invention is not limited thereto. For example, the meta container 400 in which the metadata is recorded may be formed as a separate container (Referring to FIG. 3b).

Besides, the meta container 400 having information for playing the stereoscopic image may be implemented in the track container (303) and be also implemented in the sample table (315) container when the meta container 400 has such information.

Figure 4:
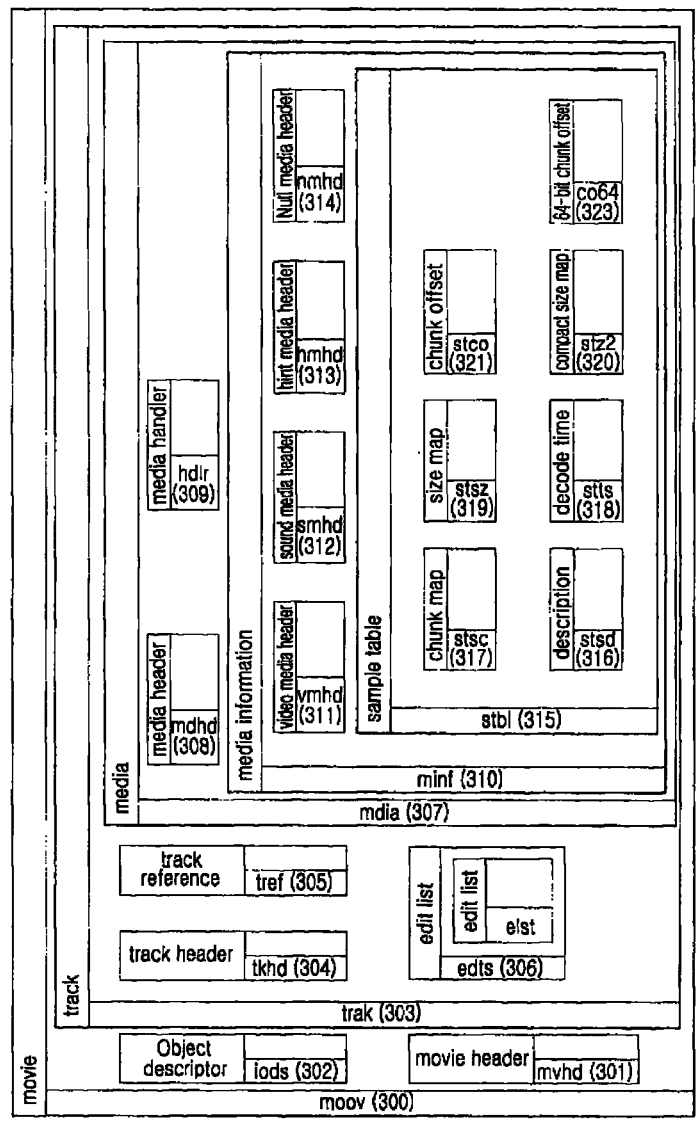
FIG. 4 is a view illustrating a detailed structure of a moov container included in a storage format of three-dimensional image data in accordance with an exemplary embodiment of the present invention.

FIG. 4 illustrates a detailed structure of an moov container 300 included in a storage format of 3D image data according to an exemplary embodiment of the present invention.

Referring to FIG. 4, the moov container 300 according to this embodiment includes an mvhd box 301, an iods box 302, and a track box 303.

The mvhd box 301 is a box representing a movie header, and contains the size, type, version, file creation time, file modification time, time scale, and overall file play time of an "mvhd".

Initialization information, such as profiles and levels for scene configuration and object description, is recorded in the iods box 302. The iods box 302 may also contain setting information of a BIFS (Binary Format For Scenes) stream for scene configuration and an OD (Object Descriptor) stream for object description.

The track box 303 is a field in which configuration information of tracks or streams included in 3D images is recorded, and includes a tkhd box 304, a tref box 305, an edts box 306, and an mdia box 307.

Basic track information including, for example, the sizes and play times of images included in tracks, track creation times, and track modification times, are recorded in the tkhd box 304.

The tref box 305 corresponds to a data reference box.

A list including time sync information of tracks is recorded in the edts box 306.

The mdia box 307 is provided for recording information on media data within tracks, and includes an mdhd box 308, an hdlr box 309, and an minf box 310.

The mdhd box 308 is a box representing a media head, and information including the play times, creation times, and modification times of media contained in tracks is recorded in the mdhd box 308.

The hdlr box 309 corresponds to a handler box defining media types.

The minf box 310 is provided for recording media data information, and includes a vmhd box 311 in which video media header information is recorded, an smhd box 312 in which sound media header information is recorded, an hmhd box 313 in which hint media header information is recorded, an nmhd box 314 in which null media header information is recorded, and an stbl box 315 in which header information for corresponding track samples is recorded.

The stbl box 315 includes an stsd box 316 in which codec type information, initialization information, etc. are recorded, an stsc box 317 in which information on the number of samples contained per chunk is recorded, an stts box 318 in which information on the decoding time of each sample is recorded, an stsz box 319 in which information on the bitstream size of each sample is recorded, an stz2 box 320 in which bitstream size information for compact samples is recorded, an stco box 321 in which information on an start address value in a file from which a chunk starts is recorded, and a co64 box 323 in which information on a start address value in a file from which a chunk starts in the case of a large file is recorded.

Figure 5:
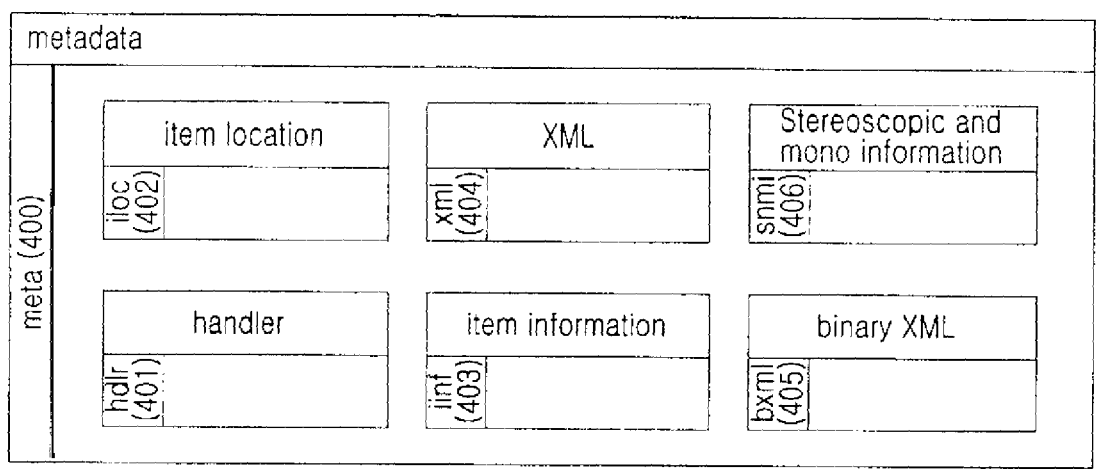
FIG. 5 is a view illustrating a detailed structure of a meta container included in a storage format of three-dimensional image data in accordance with an exemplary embodiment of the present invention.

FIG. 5 is a view illustrating a detailed structure of a meta container included in a storage format of three-dimensional image data in accordance with an exemplary embodiment of the present invention. Referring to FIG. 5, the meta container 400 in which metadata is recorded may include an hdlr box 401, an iloc box 402, an iinf box 403, an xml box 404, a bxml box 405, and a snmi box 406. The meta container (400) may or may not include other boxes excluding the snmi box (406).

The hdlr box 401 corresponds to a handler box defining the type of metadata.

Identification codes of respective items constituting stereoscopic or monoscopic images, location information of the respective items, and information on the size of the respective items are recorded in the iloc box 402. For example, the location information may be an address value of a memory stored in the media data corresponding to the items and the information on the size may be a value indicative of a length of a bit stream corresponding to the items.

The iinf box 403 contains a image type identification indicative of type of image. It is preferable that the image type identification include information for encoding the items. For example, when the item is the stereoscopic image, the image type identification is set to identification codes having 'S' indicative of stereoscopic image. In details, image type identification can be set as S1, S2, S3, . . . Sn. Also, when the item is the monoscopic image, the image type identification is set as identification codes having 'M' indicative of stereoscopic image. In details, image type identification can be set as M1, M2, M3, . . . Mn.

The xml box is a container in which xml data is recorded, and the bxml box 405 is a container in which binary xml data is recorded.

Information including the sizes of monoscopic images and stereoscopic images consisting of multiple images (e.g. left and right images), information on cameras photographing the stereoscopic images, display information, and stereoscopic image configuration information is recorded in the snmi box 406. In this embodiment, the snmi box 406 has been illustrated as a box in which information including the sizes of stereoscopic images consisting of multiple images (e.g. left and right images), information on cameras photographing the stereoscopic images, display information, and stereoscopic image configuration information is recorded. However, the present invention is not limited thereto, and it is sufficient to record only information contained in the snmi box 406. Furthermore, the information in the snmi box (406) may be classified by the characteristic of the information and be stored in respective boxes.

More specially, the image widths and heights of compound images, a distance between two cameras photographing left and right images, the focal lengths of camera lenses with respect to a subject, a rotation angle about an object, a central focus, a detailed camera arrangement (information indicating if a camera photographing a left image and a camera photographing a right image are arranged on left and right sides respectively, or if a camera photographing a left image and a camera photographing a right image are arranged in such a manner as to cross each other), an optical distance between a 3D image viewer and a display apparatus, the maximum value of vertical disparity used for 3D effects, minimum disparity between left and right images, maximum disparity between left and right images, values for setting 3D image types (formats illustrated in FIG. 2, a format including only single left or right images, etc.), the sizes and order of images arranged according to respective types, values for specifying synchronizations between frames included in 3D images, values for setting images to be initially encoded between left and right images, and so forth may be recorded in the snmi box 406.

Figure 6:
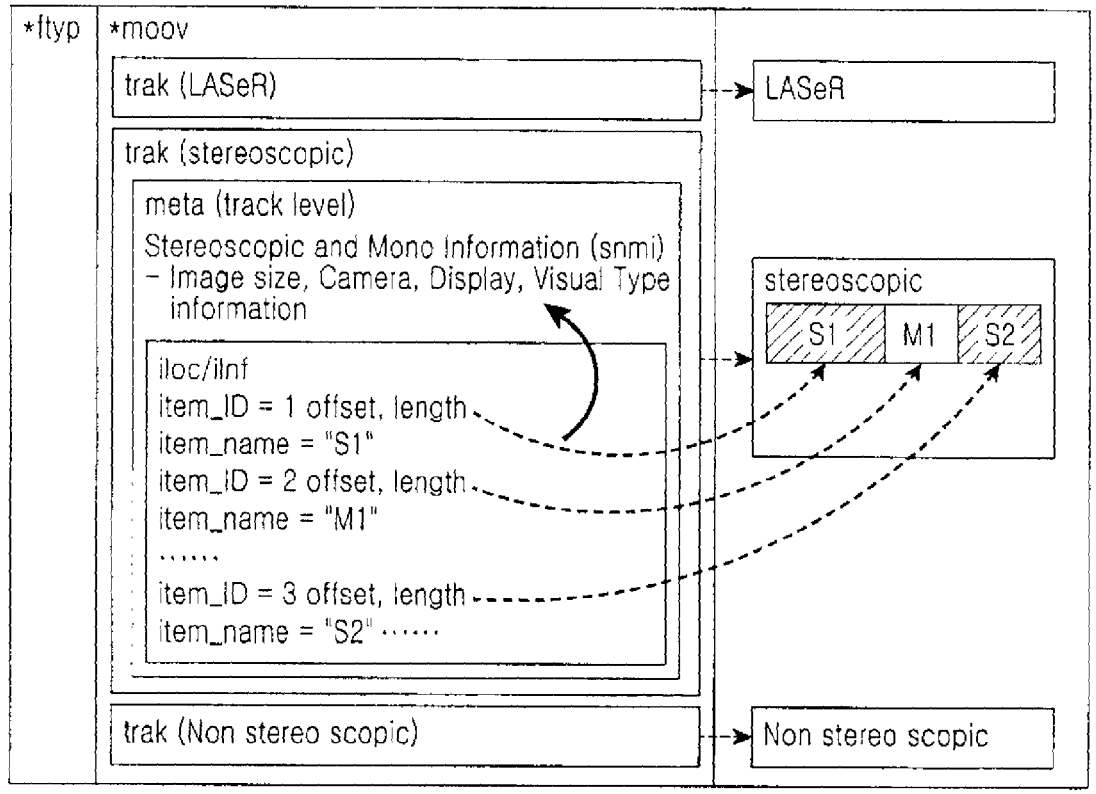
FIG. 6 is a conceptual view according to an example of a storage format of three-dimensional image data in accordance with an exemplary embodiment of the present invention.

FIG. 6 conceptually illustrates an example of a storage format of 3D image data according to an exemplary embodiment of the present invention. Referring to FIG. 6, the storage format of 3D image data according to this embodiment exemplifies a case where configuration information of compound image data is stored in the moov container 300, based on the ISO base media file format. The compound image data may include at least one stereoscopic image stream and at least one monoscopic image stream. In consideration this, snmi box 406 in the meta container 400 contains the sizes of monoscopic image and stereoscopic images consisting of multiple images (e.g. left and right images), information on cameras photographing the stereoscopic images, display information, and stereoscopic image configuration information. The iloc box 402 contains identification (e.g. item_ID)s which are assigned to the stereoscopic image streams and monoscopic image stream in sequence, the address value of a memory (e.g. offset), and lengths of image streams (e.g. length). Also, the iinf box 403 contains image type identification (e.g, item_name).

Figure 7:
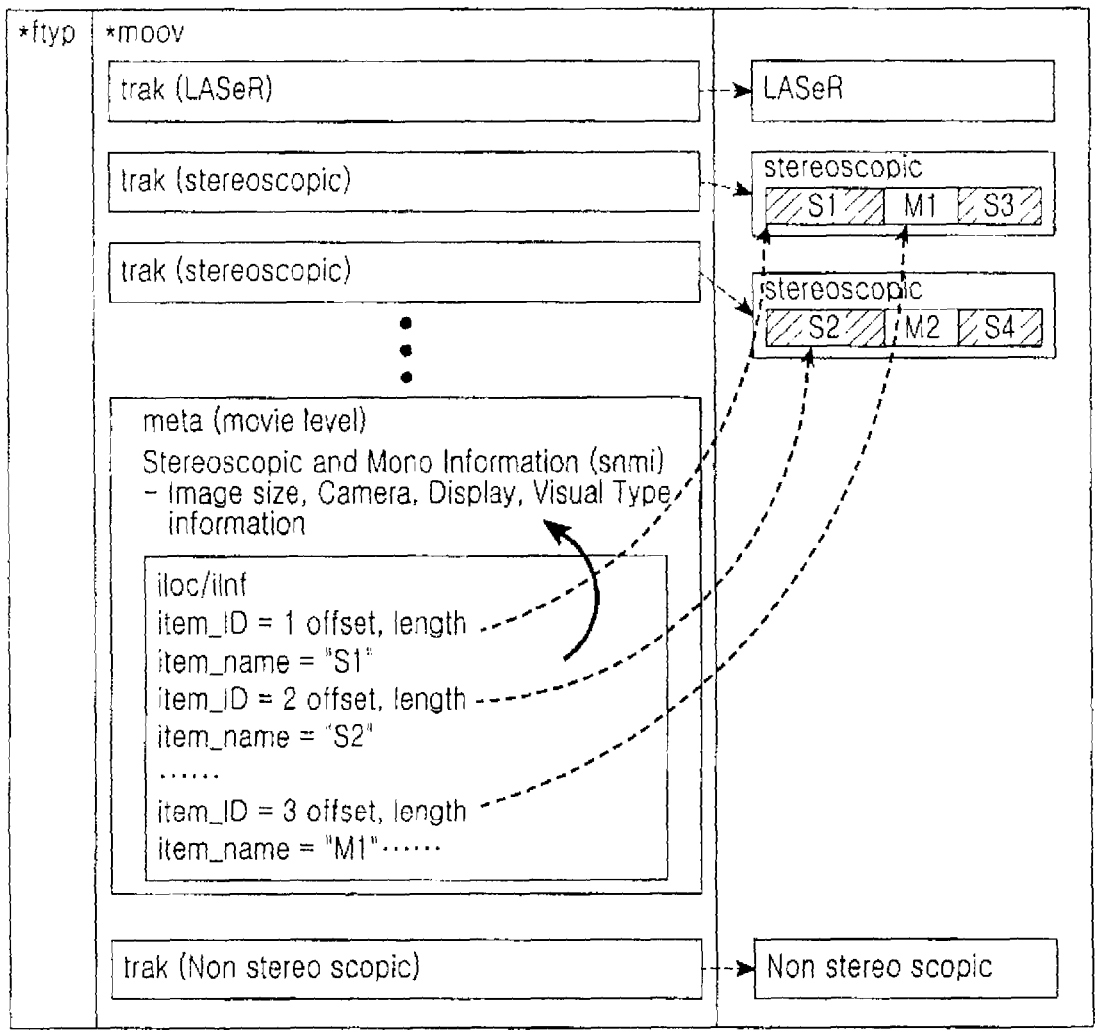
FIG. 7 is a conceptual view according to another example of a storage format of three-dimensional image data in accordance with an exemplary embodiment of the present invention.

FIG. 7 conceptually illustrates another example of a storage format of 3D image data according to exemplary embodiment of the present invention. Referring to FIG. 7, the storage format of 3D image data according to this embodiment exemplifies that the compound image comprises two elementary streams, dissimilar to FIG. 6. For example, two elementary streams may be a left image stream and a right image stream. Accordingly, the moov container 300 comprises two track box 303 which records configuration information on the respective streams. Snmi box 406 in the meta container 400 contains the sizes of monoscopic image and stereoscopic images, information on cameras photographing the stereoscopic images, display information, and stereoscopic image configuration information. The iloc box 402 contains identification (e.g. item_ID)s which are assigned to the stereoscopic image streams and monoscopic image stream in sequence, the address value of a memory (e.g. offset), and lengths of image streams (e.g. length), and the iinf box 403 contains image type identification (e.g. item_name).

It can be noted that even when compound image comprises two elementary streams, compound images may be easily stored using Snmi box 406, the iloc box 402, and the iinf box 403 provided in the meta container 400.

In the storage format of 3D image data according to an exemplary embodiment of the present invention, even when the meta container 400 included in the moov container 300 has been illustrated as FIG. 6 and FIG. 7, the present invention is not limited thereto. For example, the meta container 400 in which the metadata is recorded may be included in the ftyp header 100 or as a separate container. Besides, the meta container 400 having information for playing the stereoscopic image may be implemented in the track container (303) and be also implemented in the sample table (315) container when the meta container 400 has such information.

Since the formats proposed in the present invention are compatible with file formats extended from the international standard file format, that is, the ISO base media file format, data including the compound image can be transmitted or applied to various multimedia applications.

Meanwhile, the data storage controller 40 stores 3D image data generated by the 3D image generator 30 in the memory in the 3D image data storage format according to the present invention. Reference will now be made to a procedure of generating a storage format of 3D image data according to an exemplary embodiment of the present invention, with reference to the aforementioned constituent elements and 3D image data storage formats.

The data storage controller 40 generates an ftyp header 100, an mdat container 200, an moov container 300, a track container (303) and an meta container 400, and stores 3D image data in a format including generated data.

First of all, the data storage controller 40 generates the ftyp header 100. Information on the file type and compatibility of 3D image data to be stored is included in the ftyp header 100. The data storage controller 40 receives information, which indicates whether 3D images include only stereoscopic images or include compound images containing a combination of stereoscopic and monoscopic images, from the 3D image generator 30, and includes and records this information in the ftyp header 100. For example, the data storage controller 40 may set the information indicating whether 3D images include only stereoscopic images or include compound images containing a combination of stereoscopic and monoscopic images by executing an operation corresponding to the program given below in Table 1.

TABLE 1

```
aligned(8) class FileTypeBox extends Box('type') {
    unsigned int(32)        major_brand;
        unsigned int(32)minor_version;
        unsigned int(32) compatible_brands[ ];   // to end of the box
}
```

That is, the data storage controller 40 sets identification information, which represents a stereoscopic MAF (Multimedia Application File Format) regarding whether stereoscopic contents partially include monoscopic data, by using a brand of the ftyp header. For example, the brand used as the identification information is set to "ss01" when 3D images include only single stereoscopic images, and is set to "ss02" when 3D images include a combination of stereoscopic images and monoscopic images. In setting the information on the file type and compatibility of stereoscopic images, this embodiment does not concretely specify the brand of the ftyp header, but various brands set as major_brand, minor_brand, compatible_brand, etc. may be used.

Next, the data storage controller 40 generates the mdat container 200, based on data received from the 3D image generator 30. Video data or audio data of each channel is recorded by a sample or a frame unit in the mdat container 200.

The data storage controller 40 also generates the moov container 300, based on the data received from the 3D image generator 30. 3D image configuration information corresponding to respective 3D image data stored in the mdat container 200 is recorded as an object-based structure in the moov 300. Also, content information including the frame rate, bit rate, and image size of media data, and sync information of the media data are recorded in the moov container 300. The object-based structure may mean the track container or a tack box (303).

Specially, the moov container 300 includes an mvhd box 301 and a track box 303. The mvhd box 301 is a box representing a movie header, and contains the size, type, version, file creation time, file modification time, time scale, and overall file play time of an "mvhd".

Preferably, the moov container 300 may selectively include an iods box 302 according to storage formats of 3D image-related information. Initialization information, such as profiles and levels for scene configuration and object description, is recorded in the iods box 302. The iods box 302 may also contain setting information of a BIFS stream for scene configuration and an OD stream for object description.

Further, the track box 303 may include a tkhd box 304, a tref box 305, an edts box 306, and an mdia box 307. Basic track information including, for example, the sizes and play times of images included in tracks, track creation times, and track modification times, are recorded in the tkhd box 304. Data references may be contained in the tref box 305, and a list including time sync information of tracks is recorded in the edts box 306. Also, information on media data within tracks may be recorded in the mdia box 307.

More specially, the mdia box 307 may include an mdhd box 308, an hdlr box 309, and an minf box 310. The mdhd box 308 is a box representing a media head, and contains information including the play times, creation times, and modification times of media contained in tracks. Also, handler data defining media types may be recorded in the hdlr box 309. The minf box 310 is a field provided for recording media data information, and may include a vmhd box 311 in which video media header information is recorded, an smhd box 312 in which sound media header information is recorded, an hmhd box 313 in which hint media header information is recorded, an nmhd box 314 in which null media header information is recorded, and an stbl box 315 in which information for corresponding track samples is recorded.

Further, the stbl box 315 may include an stsd box 316 in which codec type information, initialization information, etc. are recorded, an stsc box 317 in which information on the number of samples contained per chunk is recorded, an stts box 318 in which information on the decoding time of each sample is recorded, an stsz box 319 in which information on the bitstream size of each sample is recorded, an stz2 box 320 in which bitstream size information for compact samples is recorded, an stco box 321 in which information on an start address value in a file from which a chunk starts is recorded, and a co64 box 323 in which information on a start address value in a file from which a chunk starts in the case of a large file is recorded. In case where a box storing information on a sample of a stereoscopic image is separately employed, the box may be implemented in the stbl box (315).

In addition, the data storage controller 40 generates the meta container 400, and stores information on the metadata of the 3D image data received from the 3D image generator 30 in the meta container 400. In this way, the meta container 400 includes an hdlr box 401, an iloc box 402, an iinf box 403, an xml box 404, and a bxml box 405 (see FIG. 5). Also, the data storage controller 40 may further incorporate an snmi box 406, in which stereoscopic image information is recorded, into the meta container 400. In the storage format of 3D image data according to an exemplary embodiment of the present invention, even when the meta container 400 included in the moov container 300 has been illustrated, the present invention is not limited thereto. For example, the meta container 400 in which the metadata is recorded may be included in the ftyp header 100 or as a separate container. In other words, the meta container 400 may be constructed as the same level container as the moov container (300) and be included in the track container.

Data defining the type of the metadata is recorded in the hdlr box 401. Also, identification codes of respective items constituting stereoscopic or monoscopic images and information on the lengths of the respective items are recorded in the iloc box 402, and information on the respective items is recorded in the iinf box 403. Further, xml data is recorded in the xml box 404, and binary xml data is recorded in the bxml box 405. Further, the sizes of stereoscopic images consisting of multiple images (e.g. left and right images), information on cameras photographing the stereoscopic images, display information, and stereoscopic image configuration information may be recorded in the snmi box 406. For example, the information to be recorded in the snmi box 406 may be set by executing an operation corresponding to the program given below in Table 2, which is stored in the data storage controller 40.

TABLE 2

```
aligned (8) class StereoscopicandMonoInformation box extend
FullBox ('snmi') version = 0, 0) {
            // compound image size
            unsigned int (16)      compound_image_width;
            unsigned int (16)      compound_image_height;
            // stereoscopic camera information
            unsigned int (32)   baseline;
            unsigned int (32)   focallength;
            unsigned int (32)   rotation;
            unsigned int (32)   convergence;
            unsigned int (1)    camera_setting;
            unsigned int (7)    reserved;
            // stereoscopic display information
            unsigend int (16)    ViewingDisplaySize;
            unsigend int (16)    MaxVerticalDisparity;
            int (16)          MinofDisparity;
            int (16)          MaxofDisparity;
            //
            unsigend int (8)     SteroScopi_ES_Type;
            unsigend int (1)     frame_sync;
            unsigned int (1)     LR_first;
            unsigned int (6)     reserved;
         if( StereoScopic_ES_Type == 1 )       //side-by-side format
            {
                  unsigned int (16)        left_image_width;
                  unsigned int (16)        right_image_width;
            }
            else if ( StereoScopic_ES_Type == 1 )
            // vertical line interleaved
format
            {
                  unsigned int (16)        odd_line_width;
                  unsigned int (16)        odd_line_count;
                  unsigned int (16)        even_line_width;
                  unsigned int (16)        even_line_count;
            }
            else if ( StereoScopic_ES_Type == 3 )
            // field sequential format
            {
                  unsigned int (16)        field_width;
                  unsigned int (16)        field_height;
            }
}
```

In Table 2, "compound_image_width" denotes a compound image display width, and "compound_image_height" denotes a compound image display height. Also, "baseline" representing camera information denotes a distance between two cameras photographing left and right images, "focallength" denotes the focal lengths of camera lenses with respect to a subject, "rotation" denotes a rotation angle between the two cameras, "convergence" denotes a distance between a central focus and the baseline, "camera setting" denotes a detailed camera arrangement that is defined according to Table 3 given below. Further, "left_image_width" denotes the width of a left image in the side-by-side format, "right_image_width" denotes the width of a right image in the side-by-side format, "odd_line_width" denotes the width of odd lines in the vertical line interleaved format, "odd_line_count" denotes the order of odd lines in the vertical line interleaved format, "even_line_width" denotes the width of even lines in the vertical line interleaved format, and "even_line_count" denotes the order of even lines in the vertical line interleaved format. Further, "field_width" denotes the width of images in the field sequential format, and "field_height" denotes the height of images in the field sequential format.

TABLE 3

| Value | Specification |
| --- | --- |
| 0 | parallel arrangement |
| 1 | cross arrangement |

In Table 3, "parallel arrangement" indicates that a camera photographing a left image and a camera photographing a right image are arranged on left and right sides respectively, and "cross arrangement" indicates that a camera photographing a left image and a camera photographing a right image are arranged in such a manner as to cross each other.

Also, in Table 2, "ViewingDisplaySize" representing information on a display apparatus denotes an optical distance between a 3D image viewer and the display apparatus, "MaxVerticalDisparity" denotes the maximum value of vertical disparity used for 3D effects, "MinofDisparity" denotes minimum disparity between left and right images, and "MaxofDisparity" denotes maximum disparity between left and right images. Further, "StereoScopic_ES_type" denotes values for setting ES types, given below in Table 4.

TABLE 4

| StereoScopic Composition Type | Identification |
| --- | --- |
| 0 | side-by-side format |
| 1 | vertical line interleaved format |
| 2 | frame sequential format |
| 3 | field sequential format |
| 4 | stereoscopic left view sequence |
| 5 | stereoscopic right view sequence |

In Table 4, "side-by-side format" is a format in which left and right images are formed as in (a) of FIG. 2, "vertical line interleaved format" is a format in which left and right images are formed as in (b) of FIG. 2, "frame sequential format" is a format in which left and right images are formed as in (c) of FIG. 2, "stereoscopic left view sequence" denotes a 3D image formed only by left images, and "stereoscopic right view sequence" denotes a 3D image formed only by right images.

Also, in Table 2, "frame_sync" denotes values for specifying synchronizations between frames included in 3D images, and "LR_first" denotes values for setting images to be initially encoded between left and right images. The "LR_first" is specified according to Table 5 given below.

TABLE 5

| | LR_First = 0 | | LR_First = 1 | |
| --- | --- | --- | --- | --- |
| Identification | Left view sequence | Right view sequence | Left view sequence | Right view sequence |
| Side-by-Side | Left side | Right side | Right side | Left side |
| Vertical line interleaved | Odd line | Even line | Even line | Odd line |
| Frame sequential | Odd frame | Even frame | Even frame | Odd frame |
| Field sequential | Odd field | Even field | Even field | Odd field |
| n ES | Main media | Sub media | Sub media | Main media |

Although the ftyp header 100, the mdat container 200, the moov container 300, and the meta container 400 have been illustrated as being generated in sequence and stored in the memory 50 in this embodiment, the present invention is not limited thereto. Regardless of the generation order of the ftyp header 100, the mdat container 200, the moov container 300, and the meta container 400, it is sufficient to store 3D image data in the memory 50 in a format including the ftyp header 100, the mdat container 200, the moov container 300, the track container (303) and the meta container 400 including information on the stereoscopic image. Furthermore the present invention does not limit whether or not a box including information on the stereoscopic image exists and other boxes excluding such boxes influencing directly the stereoscopic image exits.

Through the above procedure, 3D image data generated by the 3D image generator 30 may be stored in the memory 50 in a format including the ftyp header 100, the mdat container 200, the moov container 300, and the meta container 400. In this way, 3D image data can be managed in such a manner as to be compatible with the international standard file format, that is, the ISO base media file format.

Figure 8:
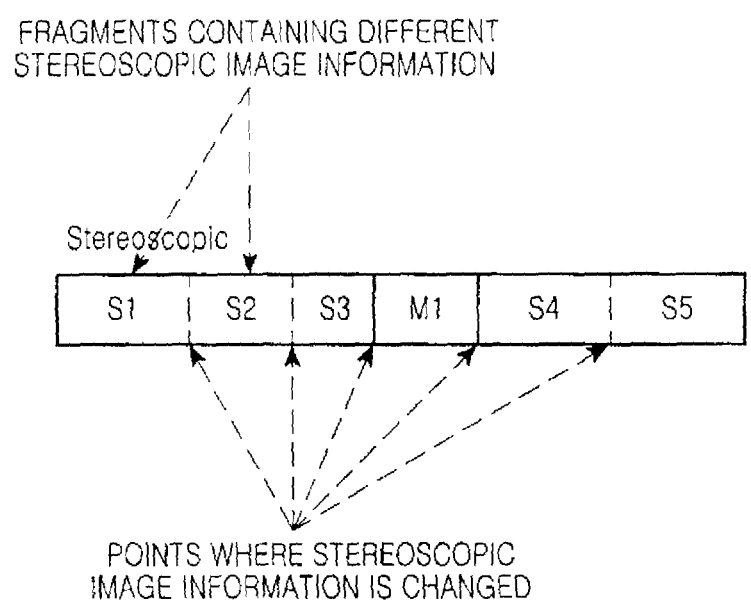
FIG. 8 is a view illustrating an example of a structure of a stereoscopic image contained in a three-dimensional image in accordance with another exemplary embodiment of the present invention.

FIG. 8 illustrates an example of a structure of a stereoscopic image according to another exemplary embodiment of the present invention. Referring to FIG. 8, the stereoscopic image included in compound image according to this embodiment may include multiple fragments. For example, a stereoscopic image may include fragments S1, S2, S3, S4, and S5. The respective fragments may be distinguished from each other at points where stereoscopic image information is changed.

Figure 9:
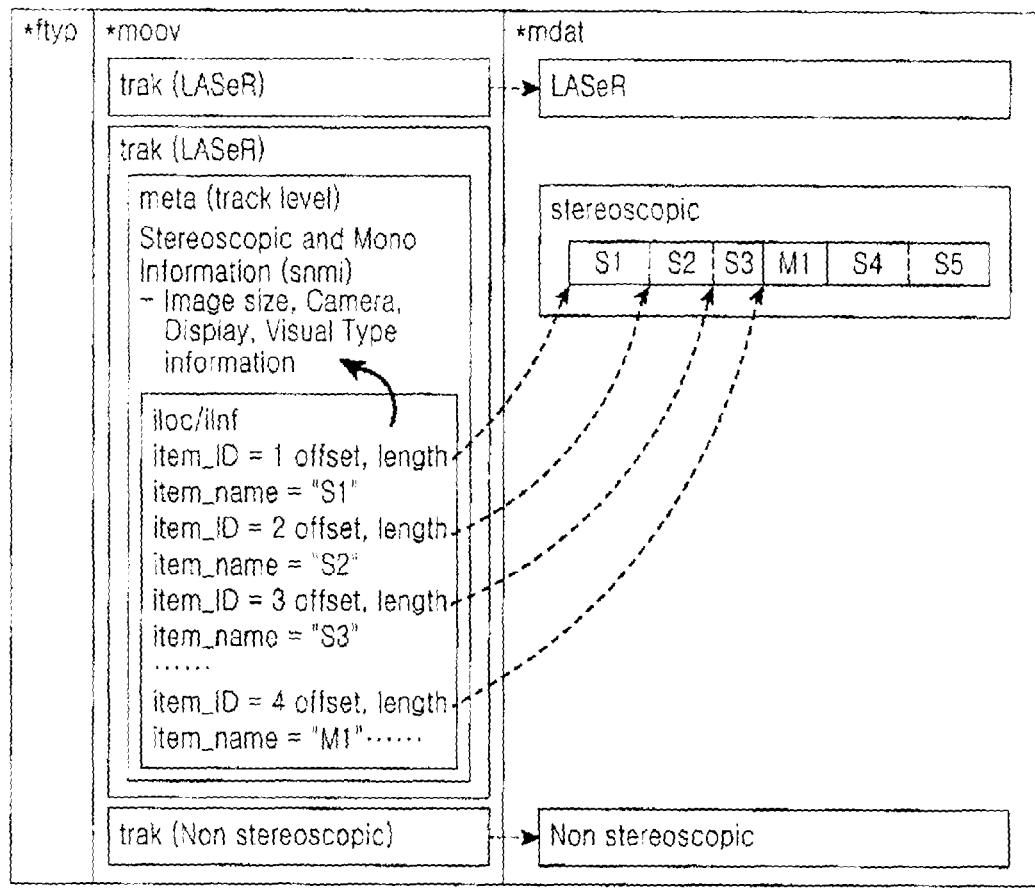
FIG. 9 is a conceptual view according to an example of a storage format of three-dimensional image data in accordance with another exemplary embodiment of the present invention.

FIG. 9 is a conceptual view according to an example of a storage format of three-dimensional image data in accordance with another exemplary embodiment of the present invention. Referring to FIG. 9, the storage format of 3D image data according to this embodiment exemplifies a case where configuration information of compound image data is stored in the moov container 300, based on the ISO base media file format.

In particular, snmi box 406 in the meta container 400 contains the sizes of monoscopic image and stereoscopic images consisting of multiple images (e.g. left and right images), information on cameras photographing the stereoscopic images, display information, and stereoscopic image configuration information. In particular, the number of fragments included in stereoscopic images is defined in snmi box 406. Fragments are grouped by same configuration information. Also, information corresponding to grouping is recorded in snmi box 406. The information in the snmi box may go into another box according to the characteristic of the information and is recorded in another box. Also, the information may be positioned in a different location according to its characteristic. For example, the information on configuration of images and on sample may be included in the meta box below the sample table box. The box including information on cameras and display may be included in the meta box below the track container.

The iloc box 402 contains identifications (e.g. item_ID) which are assigned to the stereoscopic image streams and monoscopic image stream in sequence based on points where stereoscopic image information is changed, the address value of a memory (e.g. offset), and lengths of image streams (e.g. length), and the iinf box 403 contains image type identification (e.g. item_name). For example, when the item is the stereoscopic image, the image type identification is set to identification codes having 'S' indicative of stereoscopic image. In details, image type identification can be set to S1, S2, S3, . . . Sn. Also, when the item is the monoscopic image, the image type identification is set to identification codes having 'M' indicative of stereoscopic image. In details, image type identification can be set to M1, M2, M3, . . . Mn.

Preferably, iloc box 402 and iinf box 403 are formed as a one box.

Figure 10:
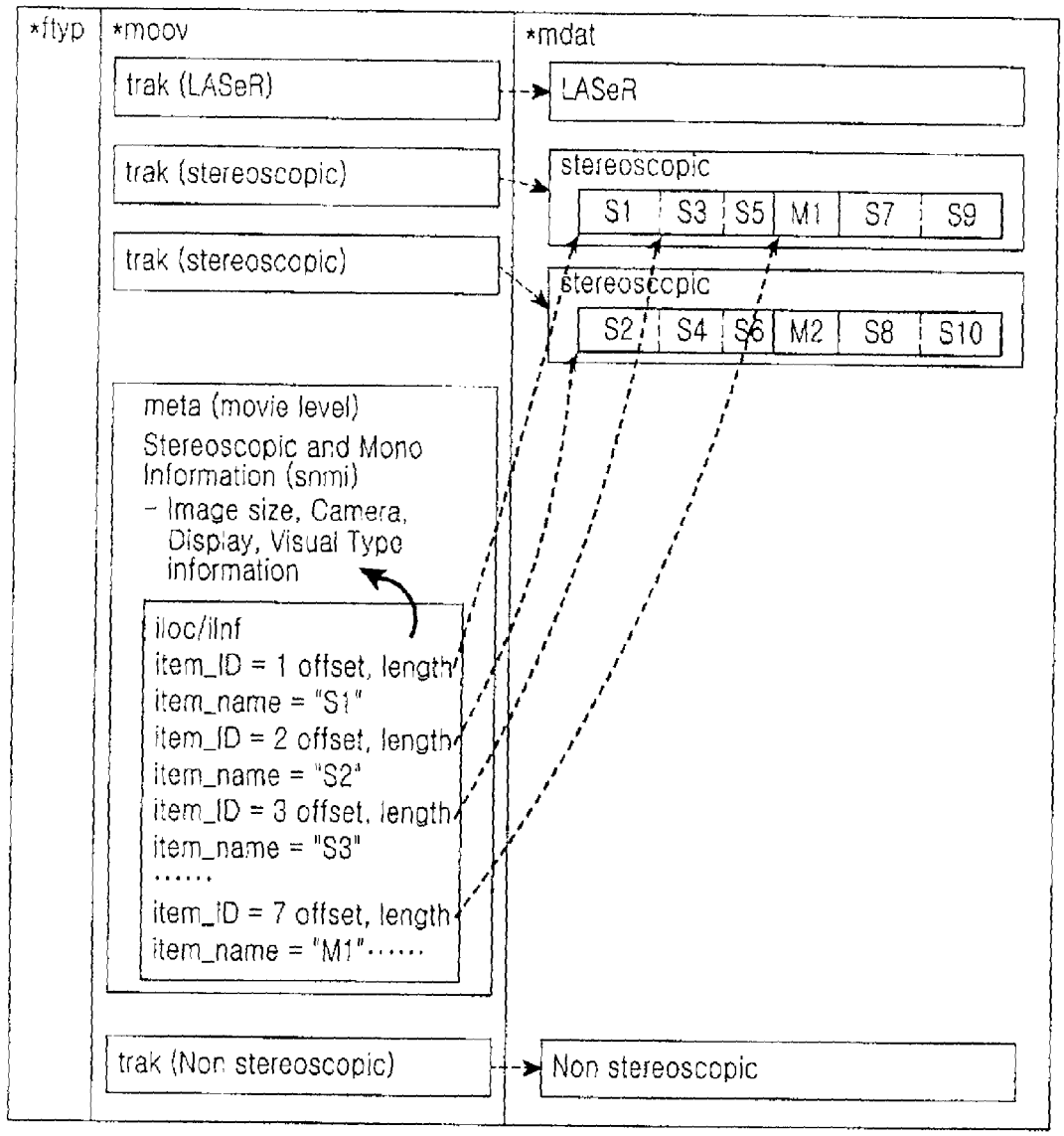
FIG. 10 is a conceptual view according to another example of a storage format of three-dimensional image data in accordance with another exemplary embodiment of the present invention.

Further, even when compound image comprises two elementary streams, the above-mentioned stereoscopic image including multiple fragments may be employed. FIG. 10 illustrates another example of a storage format of 3D image data according to another exemplary embodiment of the present invention. Referring to FIG. 10, the storage format of 3D image data according to this embodiment exemplifies that the compound image comprises two elementary streams, dissimilar to FIG. 6. For example, two elementary streams may be left image stream and right image stream. Accordingly, the moov container 300 comprises two track boxs 303 which records configuration information on the respective streams. Snmi box 406 in the meta container 400 contains the sizes of monoscopic image and stereoscopic images consisting of multiple images (e.g. left and right images), information on cameras photographing the stereoscopic images, display information, and stereoscopic image configuration information. In particular, the number of fragments included in stereoscopic images are defined in snmi box 406. Fragments are grouped by same configuration information. Also, information corresponding grouping is recorded in smni box 406.

The iloc box 402 contains identifications (e.g. item_ID) which are assigned to the stereoscopic image streams and monoscopic image stream in sequence based on a turning point where stereoscopic image information is changed, the address value of a memory (e.g. offset), and lengths of image streams (e.g. length), and the iinf box 403 contains image type identification (e.g. item_name). Herein, a basis for assignment of identification (e.g. item_ID) and image type identification (e.g. item_name) is points where stereoscopic image information is changed.

In the storage format of 3D image data according to an exemplary embodiment of the present invention, although the meta container 400 included in the moov container 300 has been illustrated as FIG. 9 and FIG. 10, the present invention is not limited thereto. For example, the meta container 400 in which the metadata is recorded may be formed in the ftyp header 100 or as a separate container.

In generating the meta container 400, the data storage controller 40 takes account of the fact that each stereoscopic image is separated in units of fragments. That is, the data storage controller 40 identifies the count of fragments included in each stereoscopic image (item_count) and allocates item_IDs in sequence by executing an operation corresponding to the program given below in Table 6. Also, when there are fragments containing the same information, the data storage controller 40 indicates them by using a separate identifier (dependence flag). Further, the data storage controller 40 allocates a separates item_ID to fragments containing the same information by executing the operation corresponding to the program of Table 6. For example, the separate item_ID may be a dependence_item_ID. The separate item_ID, that is, the dependence_item_ID is indicative of fragments containing the same information as that contained in a fragment of a specific item_ID, and may be used by making reference to existing item_IDs.

TABLE 6

```
Syntax
aligned (8) class StereoscopicandMonoInformation box extend
FullBox ('snmi' version = 0, 0) {
    // stereoscopic visual type information
    unsigned int (1)    Is_VideoSafety;
    if ( Is_VideoSafety) {
    }
    unsigned int (16)        item_count;
    for ( i=0; i<item_count; i++ ) {
        unsigend int (16)    item_ID;
        unsigned int (1)     Is_StereoScopic_Information;
        unsigned int (7)     reserved;
        if (Is_StereoScopic_Information) {
            unsigned int (1)     dependence_flag;
            unsigned int (7)     reserved;
            if ( dependence_flag == 1 ) {
                unsigned int (16)    dependence_item_ID;
            } else {
                // stereoscopic camera information
                unsigned int (1)     Is_CamParams;
                // stereoscopic display information
                unsigned int (1)     Is_DisplayInfomation;
                unsigned int (6)     reserved;
                if(Is_CamParams)    {
                    unsigend int (32)    baseline;
                    unsigned int (32)    focallength;
                    unsigned int (32)    ConvergenceDistance;
                    unsigned int (1)     Is_camera_cross;
                    unsigned int (7)     reserved;
                    if (Is_camera_cross) {
                        unsigned int (32)    rotation[ ];
                    }
                }
                if ( Is_DisplayInformation ) {
                    unsigend int (16)    ViewingDistance;
                    int (16)             MinofDisparity;
                    int (16)             MaxofDisparity;
                }
            }
        }
    }
}
```

Additionally, the data storage controller 40 may group fragments containing the same information by performing an operation corresponding to the program given below in Table 7. That is, using "extent_count" provided in the ISO base media file format, the data storage controller 40 calculates and indicates the number of the types of different fragments included in each stereoscopic image, and records stereoscopic image-related information according to the respective types.

TABLE 7

```
Syntax
aligned (8) class StereoscopicandMonoInformation box extend
FullBox ('snmi' version = 0, 0) {
    // stereoscopic visual type information
        unsigned int (8)     Stereoscopic_Composition_Type;
        unsigned int (1)     LR_First;
        unsigned int (1)     Is_VideoSafety;
        unsigned int (6)     reserved;
```

TABLE 7-continued

```
    if ( Is_VideoSafety ) {
    }
    unsigned int (16)   item_count;
    for ( i=0; i<item_count; i++ ) {
        unsigend int (16)       item_ID;
        unsigned int (16)       extent_count;
        for ( j=0; j<extent_count; j++ ) {
            // stereoscopic camera information
                unsigned int (1)       Is_CamParams;
            // stereoscopic display information
                unsigned int (1)       Is_DisplayInfomation;
                unsigned int (6)       reserved;
            if(Is_CamParams) {
                unsgiend int (32)       baseline;
                unsigned int (32)       focallength;
                unsigned int (32)       ConvergenceDistance;
                unsigned int (1)        Is_camera_cross;
                unsigned int (7)        reserved;
                if (Is_camera_cross) {
                    unsigned int (32)   rotation[ ];
                }
            }
            if ( Is_DisplayInformation ) {
                unsigend int (16)       ViewingDistance;
                int (16)                MinofDisparity;
                int (16)                MaxofDisparity;
            }
        }
    }
}
```

Further, it is possible for the data storage controller 40 to perform an integrated operation of the operation for allocating as many item_IDs as the count of fragments included in each stereoscopic image (i.e. operation corresponding to the program of Table 6) and the operation for grouping fragments containing the same information (i.e. operation corresponding to the program of Table 7). Such an integrated operation may be implemented by an operation corresponding to the program given below in Table 8.

TABLE 8

```
Syntax
aligned (8) class StereoscopicandMonoInformation box extend
FullBox ('snmi' version = 0, 0) {
    // stereoscopic visual type information
        unsigned int (8)       Stereoscopic_Composition_Type;
        unsigned int (1)       LR_First;
        unsigned int (1)       Is_VideoSafety;
        unsigned int (6)       reserved;
    if ( Is_VideoSafety ) {
    }
    unsigned int (16)   item_count;
    for ( i=0; i<item_count; i++ ) {
        unsigned int (16)      item_ID;
        unsigned int (16)      extent_count;
        unsigned int (8)       Is_extent_information[extent_count];
        for ( j=0; j<extent_count; j++ ) {
            if ( Is_extent_information[j] ) {
                unsigned int (16)   dependence_extent_index;
            } else {
            // stereoscopic camera information
                unsigned int (1)       Is_CamParams;
            // stereoscopic display information
                unsigned int (1)       Is_DisplayInfomation;
                unsigned int (6)       reserved;
            if(Is_CamParams) {
                unsgiend int (32)       baseline;
                unsigned int (32)       focallength;
                unsigned int (32)       ConvergenceDistance;
                unsigned int (1)        Is_camera_cross;
                unsigned int (7)        reserved;
                if (Is_camera_cross) {
                    unsigned int (32)   rotation[ ];
```

TABLE 8-continued

```
                }
            }
            if ( Is_DisplayInformation ) {
                unsigend int (16)       ViewingDistance;
                int (16)                MinofDisparity;
                int (16)                MaxofDisparity;
            }
        }
    }
}
```

According to the data storage format proposed in the present invention, 3D image data can be stored in a format compatible with the international standard file format, that is, the ISO base media file format, and the stored data can be transmitted or applied to various multimedia applications.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of storing three-dimensional (3D) image data in a recording medium, the method comprising:
    loading, by a processor, in a predetermined field representing a file type, an image type indicator selected from the group consisting of a stereoscopic content indicator and a stereo-monoscopic mixed content indicator, wherein the stereoscopic content indicator represents that a plurality of images consists entirely of stereoscopic images, and the stereo-monoscopic mixed content indicator represents that the plurality of images includes mixed content comprising both a monoscopic image and a stereoscopic image;
    loading, in a predetermined image configuration information container field, scene descriptor information indicating temporal and spatial relations between a plurality of media objects included in the 3D image data, object configuration information indicating attributes of each media object of said plurality of media objects, and configurative information indicating a configurative relation between encoded streams of the plurality of media objects;
    loading, in an image data container field, media data of an image to be stored; and
    loading, in a meta container field, metadata including information for playing the 3D image data.

2. The method as claimed in claim 1, wherein the meta container field is included in the predetermined image configuration information container field.

3. The method as claimed in claim 1, wherein, the loading includes storing in the field representing a file type the stereo-monoscopic mixed content indicator.

4. The method as claimed in claim 1, wherein the metadata includes configuration information on the stereoscopic content and the stereo-monoscopic mixed content, on sizes of images included in the stereoscopic content and the stereo-monoscopic mixed content, photographing information, and display information, and is recorded in an snmi box of the meta container field.

5. The method as claimed in claim 4, wherein the metadata includes information on location of the monoscopic and stereoscopic images included in the stereo-monoscopic mixed content, on sizes of data of the monoscopic and stereoscopic images, and on image type identifications of the monoscopic and stereoscopic images, the location information and data sizes are recorded in an iloc box of the meta container field, the image type identifications are recorded in an iinf box of the meta container field.

6. The method as claimed in claim 4, wherein the photographing information comprises a distance between a plurality of cameras, focal lengths of multiple camera lenses with respect to a subject, a rotation angle about an object, a maximum vertical disparity, and maximum disparity and minimum disparity between images photographed through the multiple camera lenses.

7. The method as claimed in claim 4, wherein, when frame rates of respective media data are different from each other, the snmi box includes information indicating reference media data and information indicating media data to be compressed first according to a type of a composite image.

8. The method as claimed in claim 2, wherein the stereoscopic image comprises at least one fragment.

9. The method as claimed in claim 8, wherein, the stereoscopic image comprises multiple fragments, fragments containing identical image information are grouped together into fragment groups, and the fragments are recorded according to the fragment groups in the meta container field.

10. The method as claimed in claim 9, wherein the number of fragment groups containing different image information is calculated, and the image information indicated by the respective fragments are recorded in the meta container field, based on the calculated number of the fragment groups.

11. The method as claimed in claim 1, wherein the metadata includes information on configuration of the stereoscopic content and stereo-monoscopic mixed content, on sizes of images included in the stereoscopic content and stereo-monoscopic mixed content, photographing information, and display information and is recorded in an snmi box of the meta container field.

12. The method as claimed in claim 11, wherein the metadata includes information on monoscopic and stereoscopic images included in the stereo-monoscopic mixed content, on the size of data of the monoscopic and stereoscopic images, and image type identifications of the monoscopic and stereoscopic images, location information and data sizes are recorded in an iloc box of the meta container field, the image type identifications are recorded in an iinf box of the meta container field.

13. The method as claimed in claim 11, wherein the photographing information comprises a distance between a plurality of cameras, focal lengths of multiple camera lenses with respect to a subject, a rotation angle about an object, a maximum vertical disparity, and maximum disparity and minimum disparity between images photographed through the multiple camera lenses.

14. The method as claimed in claim 11, wherein, when frame rates of respective media data are different from each other, the snmi box includes information indicating reference media data and information indicating media data to be compressed first according to a type of a composite image.

15. The method as claimed in claim 1, wherein the stereoscopic image comprises at least one fragment.

16. The method as claimed in claim 15, wherein, the stereoscopic image comprises multiple fragments, fragments containing identical image information are grouped together into fragment groups and the fragments are recorded according to the fragment groups in the meta container field.

17. The method as claimed in claim 16, wherein the number of fragment groups containing different image information is calculated, and the image information indicated by the respective fragments are recorded in the meta container field, based on the calculated number of the fragment groups.

18. A method of storing, in a non-transitory recording medium, three-dimensional (3D) image data representing a 3D image, the method comprising:

storing, in the recording medium, the 3D image data in a single 3D image data object having a FTYP field, a MOOV field, a MDAT field, and a META field;

wherein the FTYP field stores only an image type indicator selected from the group consisting of a stereoscopic content indicator and a stereo-monoscopic mixed content indicator, wherein the stereoscopic content indicator represents that a plurality of images consists entirely of stereoscopic images, and the stereo-monoscopic mixed content indicator represents that the plurality of images includes mixed content comprising both a monoscopic image and a stereoscopic image;

wherein the MOOV field stores scene descriptor information indicating temporal and spatial relations between a plurality of media objects included in the 3D image, object configuration information indicating attributes of each media object of said plurality of media objects, and configurative information indicating a configurative relation between encoded streams of the plurality of media objects;

wherein the MDAT field stores media data of an image to be stored; and wherein the META field stores metadata including information for playing the 3D image data.

19. The method as claimed in claim 18, the method further comprising:

loading the 3D image data from the recording medium by a data storage controller.

20. An apparatus for storing, in a recording medium, three-dimensional (3D) image data, the apparatus comprising:

a data storage controller, operatively connected to the recording medium, for storing the 3D image data by:

loading, in a predetermined field representing a file type, an indicator selected from the group consisting of a stereoscopic content indicator and a stereo-monoscopic mixed content indicator, wherein the stereoscopic content indicator represents that a plurality of images consists entirely of stereoscopic images, and the stereo-monoscopic mixed content indicator represents that the plurality of images includes a stereo-monoscopic mixed content comprising both a monoscopic image and a stereoscopic image;

loading, in a predetermined image configuration information container field, scene descriptor information indicating temporal and spatial relations between a plurality of media objects, object configuration information indicating attributes of each media object of said plurality of media objects, and configurative information indicating a configurative relation between encoded streams of the plurality of media objects;

loading, in an image data container field, media data of an image to be stored; and loading, in a meta container field, metadata including information for playing the 3D image data.

* * * * *